US006549385B1

(12) United States Patent
Bald et al.

(10) Patent No.: US 6,549,385 B1
(45) Date of Patent: Apr. 15, 2003

(54) TEST CIRCUIT FOR A WITHSTAND VOLTAGE TESTER

(75) Inventors: Roger A. Bald, Round Lake Beach, IL (US); Pin-Y Chen, Taipei (TW)

(73) Assignee: Associated Research, Inc., Lake Forest, IL (US)

( * ) Notice: Subject to any disclaimer, the term of this patent is extended or adjusted under 35 U.S.C. 154(b) by 0 days.

(21) Appl. No.: 09/421,361

(22) Filed: Oct. 19, 1999

(51) Int. Cl.$^7$ .............. H02H 3/14; H02H 3/20; H02H 3/24; H02H 3/38; H02H 3/00
(52) U.S. Cl. .................... 361/88; 361/42
(58) Field of Search ................ 324/500–600, 324/555, 764, 763, 765, 73.1; 361/88, 42

(56) References Cited

U.S. PATENT DOCUMENTS

| | | | | |
|---|---|---|---|---|
| 3,555,360 A | * | 1/1971 | Lee ................. | 317/18 |
| 4,087,846 A | * | 5/1978 | Hughes et al. ......... | 361/42 |
| 4,313,085 A | * | 1/1982 | Balchunas ............ | 324/54 |
| 5,481,194 A | * | 1/1996 | Schantz et al. ........ | 324/522 |
| 5,675,465 A | * | 10/1997 | Tanaka et al. ......... | 361/42 |
| 5,939,993 A | * | 8/1999 | Burtin et al. ......... | 340/662 |
| 5,963,405 A | * | 10/1999 | Engel ................ | 361/42 |
| 6,278,596 B1 | * | 8/2001 | Simpson .............. | 361/42 |

* cited by examiner

Primary Examiner—Kim Huynh
Assistant Examiner—Z. Kitov
(74) Attorney, Agent, or Firm—Bacon & Thomas

(57) ABSTRACT

A test circuit for a withstand voltage tester, which includes a high voltage source, an overload-protective current detection device having one end connected to the high voltage source and an opposite end connected to the sample to be tested, and a second current detection device connected to the circuit of the high voltage source and the overload-protective current detection device, the second current detection device having a switch connected to the high voltage source, and detector means connected to ground to detect a high voltage, such that when the human body touches the test circuit and receives a high voltage through the ground, the detector means detects the presence of the high voltage, and outputs a signal to the switch upon such detection, causing the switch to cut off the circuit between the high voltage source and the test sample.

2 Claims, 3 Drawing Sheets

TEST CIRCUIT FOR A WITHSTAND VOLTAGE TESTER

BACKGROUND OF THE INVENTION

The present invention relates to a withstand voltage tester, and more specifically to a test circuit for a withstand voltage tester, which has a safety means to keep the operator from the risk of suffering a sustained electric shock.

When electric appliances are manufactured, they must be examined through a series of safety compliance tests before delivery. The withstand voltage test is a compulsory production test on electric appliances. The test voltage for such a withstand voltage test can be as high as 5,000V. Because an operator may have to test a large number of electric appliances within a short length of time, an accidental contact of the hand with the test circuit may happen, thereby causing an accidental electric shock.

FIG. 1 shows a test circuit 1 for a withstand voltage tester according to the prior art. The test circuit 1 comprises a high voltage source 11. The high voltage source 11 is connected to a current detection device 15 through an electric line 13. The current detection device 15 is connected to the test sample (electric appliance to be tested) 17 through an electric line 13. The current detection device 15 is also connected to a withstand voltage tester (not shown), which is in turn connected to the high voltage source 11. The test circuit 1 is also connected to the grounding terminal 18 through the electric line 13. When the body 2 touches the test circuit 1 accidentally, electric current passing through the current detection device 15 is equal to the value of the electric current A1 passing through the test sample 17 plus the value of the electric current A2 passing through the human body 2. If A1=10 mA, A2=80 mA, and the preset trip current of the withstand voltage tester is 100 mA, the total current A=A1+A2=90 mA<100 mA. Therefore, the tester does not trip off, and the high voltage source 11 keeps outputting the high voltage A. Under this condition, the operator may subject to the risk of continuous electric shock by a high voltage.

FIG. 2 shows a test circuit 1 for another structure of withstand voltage tester according to the prior art. This test circuit 1 comprises a high voltage source 11. The high voltage source 11 is connected to a current detection device 15' through an electric line 13. The current detection device 15' is connected to the test sample 17 through an electric line 13. The current detection device 15' is also connected to a withstand voltage tester (not shown), which is in turn is connected to the high voltage source 11. The test circuit 1 is connected to the grounding terminal 18 through an electric line 13. Normally, the electric current A1 which passes through the test sample 17 is detected by the current detection device 15'. However, when the human body 2 touches the test, circuit 1, the current A1 passing through the human body 2 is not detected by the current detection device 15', i.e. the current detection device 15' detects only the current A1 passing through the test sample 17. Therefore, the high voltage source 11 keeps outputting the high voltage current A, and the operator may subject to the risk of a continuous electric shock by a high voltage.

As indicated above, the aforesaid prior art test circuits cannot keep the operator out of the risk of suffering a sustained electric shock. If the operator touches the test circuit 1 accidentally during a test, the high voltage current A2 passes through the grounding terminal 18 to the operator's body, causing the operator to be injured by the electric shock. The warning word of "Danger! High Voltage!" on the withstand voltage tester does not help to keep the operator from an electric shock.

SUMMARY OF THE INVENTION

The present invention has been accomplished to provide a withstand voltage tester which eliminates the aforesaid problem. According to the present invention, a second current detection device is installed in the test circuit and connected to the high voltage source and the overload-protective current detection device. The second current detection device comprises a switch connected to the high voltage source, and detector means connected to the ground to detect a high voltage. When the human body touches the test circuit and receives a high voltage through the ground, the detector means detects the presence of the high voltage, and outputs a signal to the switch upon such a detection, causing the switch to cut off the circuit between the high voltage source and the test sample.

DETAILED DESCRIPTION OF THE PREFERRED EMBODIMENT

Figure 1:
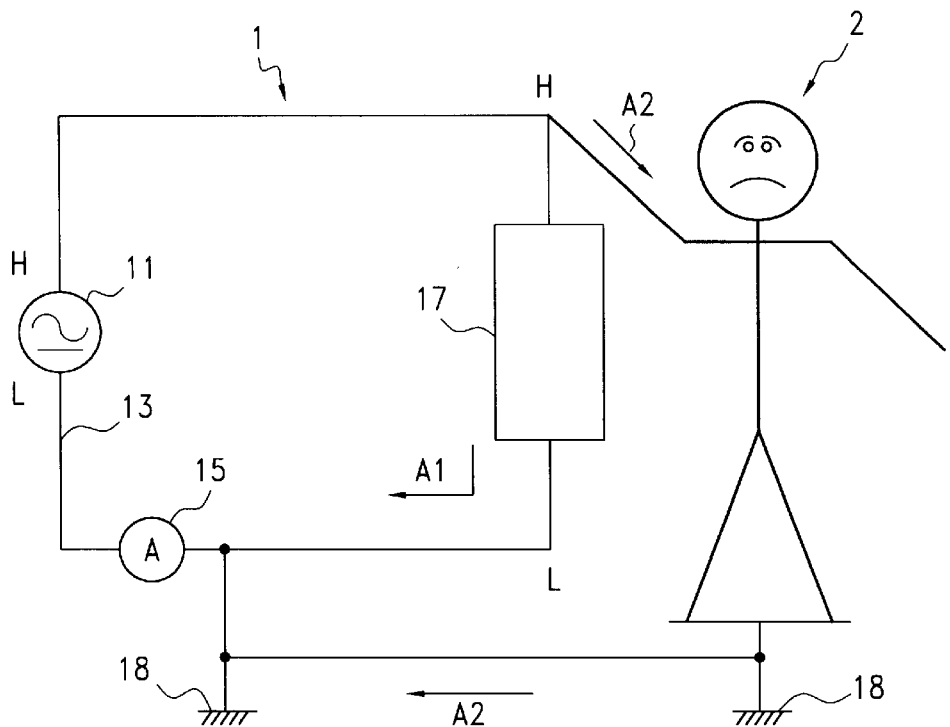
FIG. 1 is a circuit block diagram of a test circuit for a withstand voltage tester according to the prior art.
Figure 2:
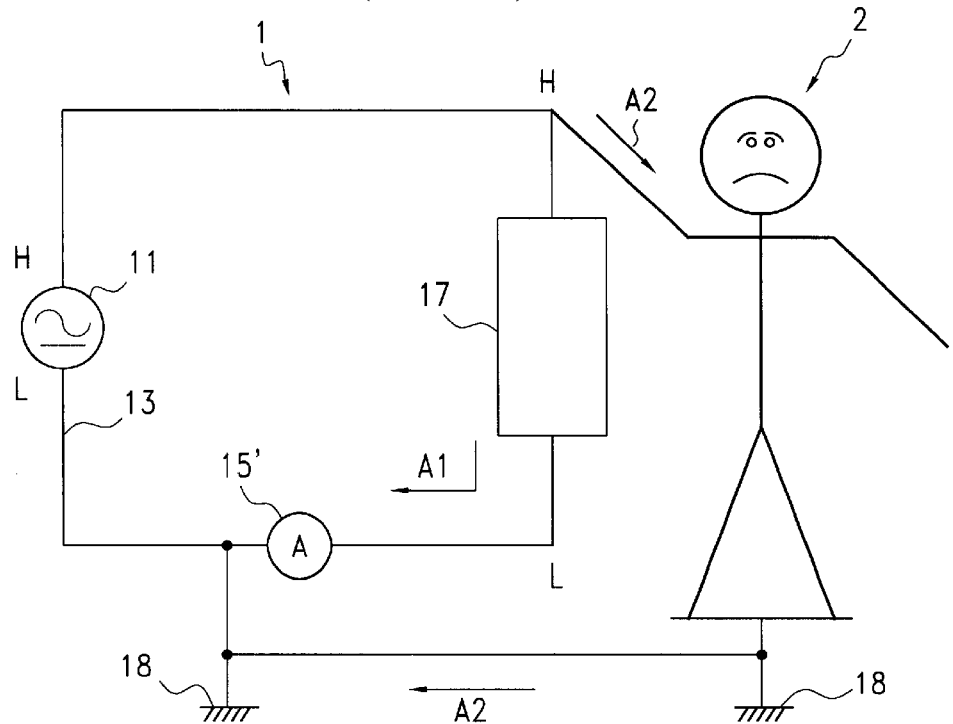
FIG. 2 is a circuit block diagram of another structure of test circuit for a withstand voltage tester according to the prior art.
Figure 3:
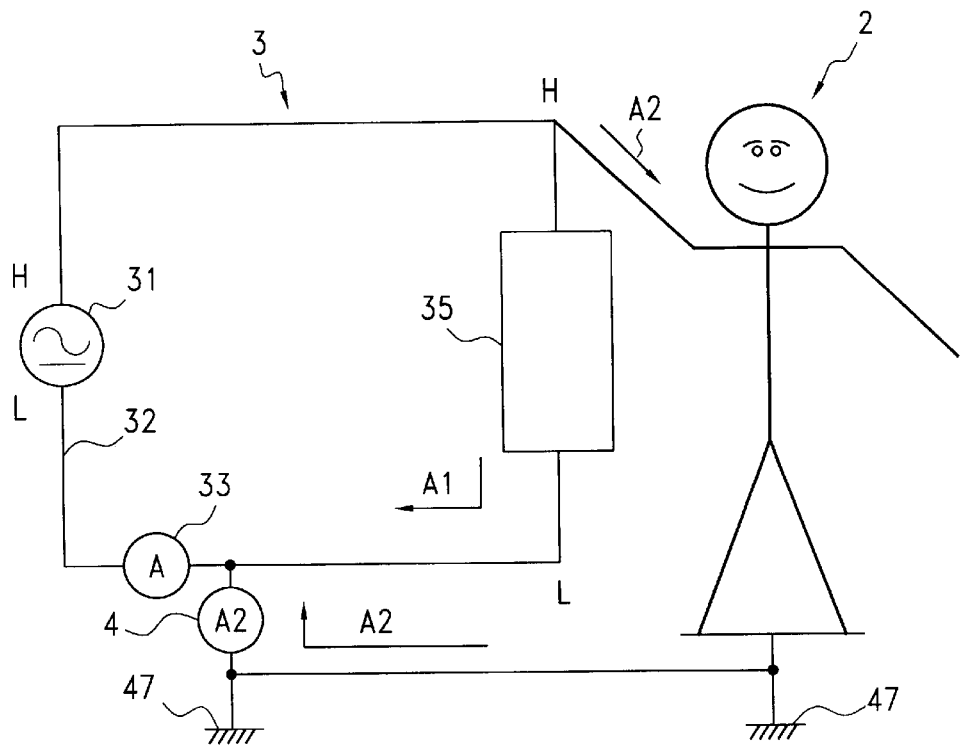
FIG. 3 is a circuit block diagram of a test circuit for a withstand voltage tester according to the present invention.
Figure 4:
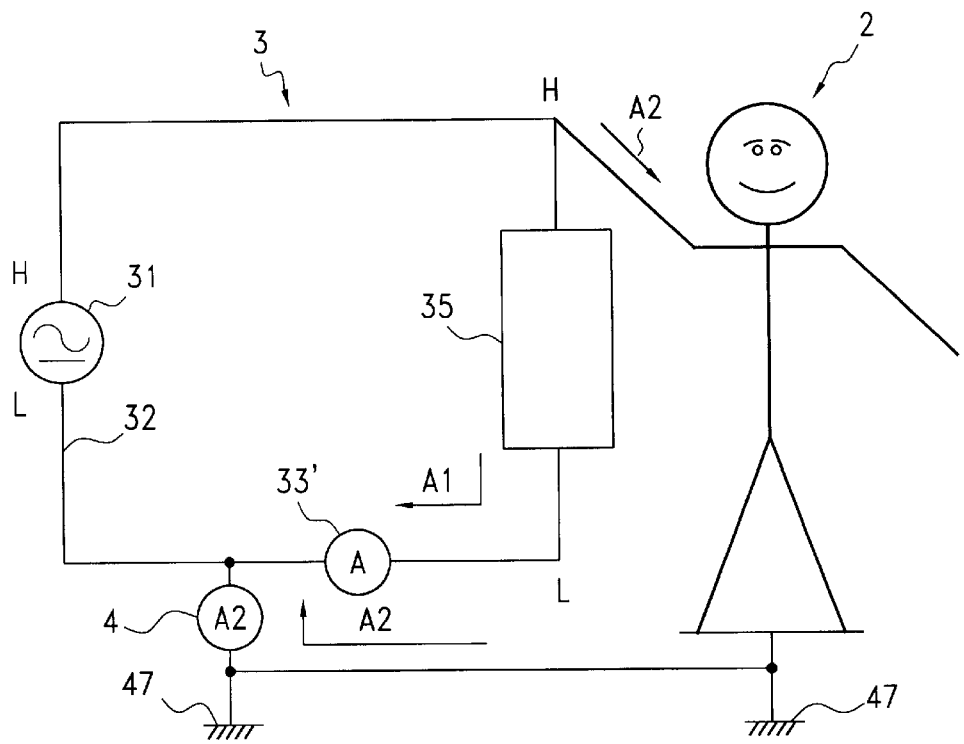
FIG. 4 is a circuit block diagram of an alternate form of test circuit according to the present invention.
Figure 5:
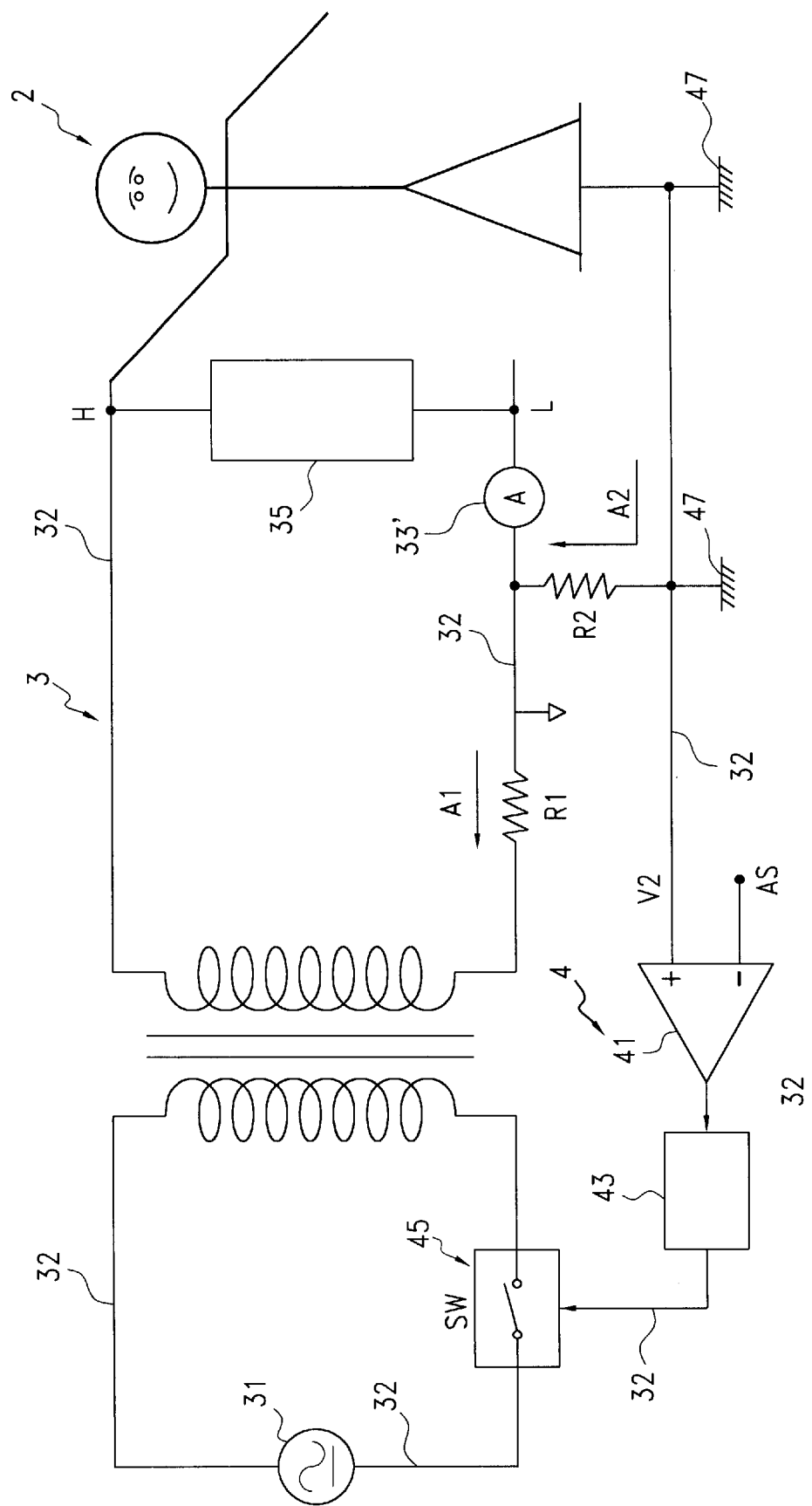
FIG. 5 is a detailed circuit diagram of the test circuit according to the present invention.

Referring to FIGS. 3, 4 and 5, the test circuit, referenced by 3, comprises a high voltage source 31. The high voltage source 31 has one end connected through an electric line 32 to a current detection device 33 (see FIG. 3) or alternatively, 33' (see FIG. 4), and then the test sample, referenced by 35. The arrangement of the current detection device 33 or 33' prevents the occurrence of an overload. The test circuit 3 further comprises a second current detection device 4 installed in the electric line 32. The second current detection device 4 comprises a resistor R2 connected in series to the test sample 35 through resistor R1, a comparator 41, the comparator 41 having a non-inverter terminal connected in series to the resistor R2 and the ground 47, an inverter terminal connected to a predetermined human body electric leakage current trip point AS, and an output terminal connected to the high voltage source 31, a latch 43 connected between the output terminal of the comparator 41 and the high voltage source 31, and a switch 45 connected between the latch 43 and the high voltage source 31.

Normally, the test circuit 3 is not touched by the human body 2, and a voltage drop V2=0 is produced at the non-inverter terminal of the comparator 41.

When the human body 2 touches the test circuit 3, the resistor R2 works as shunt means. When the high voltage current A2 passes through the ground 47 and the resistor R2 to the human body 2, a voltage drop V2=R2×A2 is produced at the non-inverter terminal of the comparator 41, and compared with the predetermined human body electric leakage current trip point AS.

If the voltage value of V2 surpasses the value of AS, the comparator 41 outputs a high potential signal to the latch 43, causing the latch 43 to lock the switch 45 at the open-circuit status, and to further stop the high voltage source 31 from outputting the high voltage current A1; A2, preventing the human body 2 from receiving the high voltage current A2.

It is to be understood that the drawings are designed for purposes of illustration only, and are not intended as a definition of the limits and scope of the invention disclosed.

What the invention claimed is:

1. A test circuit for a withstand voltage tester, comprising
   a high voltage source arranged to supply a high voltage to a sample;
   an overload protective first current detector connected in series between the high voltage source and the sample for detecting leakage currents in the sample when said high voltage is applied;
   a switch also connected in series with the high voltage source and the sample; and
   a second current detector connected between the sample and ground for detecting high voltages between the test circuit and ground resulting from contact between a person and the sample, and for causing said switch to cut off the high voltage circuit between the high voltage source and the sample when a high voltage is detected between the test circuit and ground.

2. A test circuit as claimed in claim 1, wherein said second current detector comprises a resistor connected between the sample and ground, a comparator having a non-inverter terminal connected to said resistor and an inverter terminal connected to a reference current source corresponding to a predetermined human body electric leakage current trip point, and an output connected to said switch, wherein when a human is subjected to said high voltage, said comparator outputs a signal to cause said switch to open and disconnect said high voltage source from said sample.

* * * * *